United States Patent
Lehtinen et al.

(10) Patent No.: US 12,528,693 B2
(45) Date of Patent: Jan. 20, 2026

(54) MOTION LIMITER WITH REDUCED STICTION

(71) Applicant: Murata Manufacturing Co., Ltd., Nagaokakyo (JP)

(72) Inventors: Pekka Lehtinen, Vantaa (FI); Akira Konno, Helsinki (FI); Matti Liukku, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 390 days.

(21) Appl. No.: 18/448,710

(22) Filed: Aug. 11, 2023

(65) Prior Publication Data

US 2024/0051816 A1 Feb. 15, 2024

(30) Foreign Application Priority Data

Aug. 12, 2022 (EP) ..................................... 22190111

(51) Int. Cl.
*B81B 3/00* (2006.01)

(52) U.S. Cl.
CPC ............ *B81B 3/001* (2013.01); *B81B 3/0051* (2013.01); *B81B 2201/0235* (2013.01); *B81B 2201/0242* (2013.01); *B81B 2203/056* (2013.01)

(58) Field of Classification Search
None
See application file for complete search history.

(56) References Cited

U.S. PATENT DOCUMENTS

| | | | |
|---|---|---|---|
| 6,508,124 B1* | 1/2003 | Zerbini | B81B 3/0072 73/514.32 |
| 2008/0173959 A1* | 7/2008 | Merassi | B81B 3/0051 73/514.24 |
| 2015/0239731 A1* | 8/2015 | Ahtee | G01P 15/125 257/415 |
| 2015/0241216 A1* | 8/2015 | Ahtee | G01P 15/125 73/504.12 |
| 2015/0241467 A1* | 8/2015 | Rytkonen | G01P 15/125 73/514.32 |
| 2017/0023606 A1* | 1/2017 | Naumann | G01P 15/125 |
| 2019/0062147 A1* | 2/2019 | Castro | B81B 7/0006 |
| 2019/0120872 A1* | 4/2019 | Geisberger | G01P 15/125 |
| 2022/0091154 A1 | 3/2022 | Nagel et al. | |

OTHER PUBLICATIONS

European Search Report issued in European Patent Application No. 22190111.9, Jan. 17, 2023, 2 pages.

* cited by examiner

*Primary Examiner* — Bilkis Jahan
(74) *Attorney, Agent, or Firm* — ArentFox Schiff LLP (57) ABSTRACT

A microelectromechanical element is provided that includes a first device part and a second device part, and a motion-limiting structure having a first stopper bump and a second stopper bump. The first and second stopper bumps extend from the first device part toward the second device part. When one of the device parts moves toward the other device part in the out-of-plane direction and crosses a displacement threshold, the first stopper bump comes into contact with the second device part before the second stopper bump contacts the second device part, and the second stopper bump comes into contact with the second device part before the first device part contacts with the second device part.

20 Claims, 13 Drawing Sheets

MOTION LIMITER WITH REDUCED STICTION

CROSS REFERENCE TO RELATED APPLICATIONS

This application claims priority to European Patent Application No. 22190111.9, filed Aug. 12, 2022, the contents of which are hereby incorporated by reference in its entirety.

TECHNICAL FIELD

The disclosure relates to microelectromechanical (MEMS) elements, and more particularly to MEMS elements having a mobile rotor that moves close to a fixed stator. Moreover, the present disclosure relates to motion limiters that prevent direct contact between the rotor and the stator.

BACKGROUND

Microelectromechanical (MEMS) devices, such as accelerometers and gyroscopes, often comprise a mass element that is suspended from fixed anchors with a flexible suspension structure that allows the mass element to move in relation to adjacent fixed structures. This mobile mass element may be called a rotor and a fixed device part that is adjacent to the rotor may be called a stator. Such fixed parts may include walls that form an enclosure around the mobile parts of the MEMS device.

Direct physical contact between the rotor and the stator is usually not desirable because it may disturb the operation of the device. The rotor and its suspension structure can be dimensioned so that direct contact does not occur in regular operation, but exceptional external shocks may still displace the rotor so much that it comes into direct contact with the stator, causing structural damage, electrical short-circuits or other faults.

Motion limiters can be implemented in MEMS devices to reduce or prevent these harmful consequences. A motion limiter may for example comprise a bump that is attached to the stator and extends from the stator toward the rotor. The bump will then be the first part which comes into contact with the rotor in the event of an external shock. It prevents direct contact between the rotor and the stator. Damage can be minimized for example by placing motion limiter bumps as far away from the sensitive areas of the device as possible.

Figure 1A:
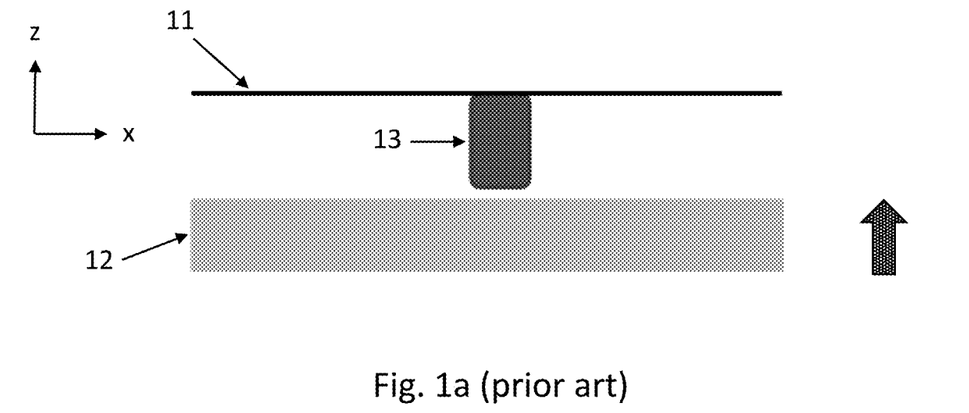
FIGS. 1a-1b illustrate a conventional motion limiter.
Figure 1B:
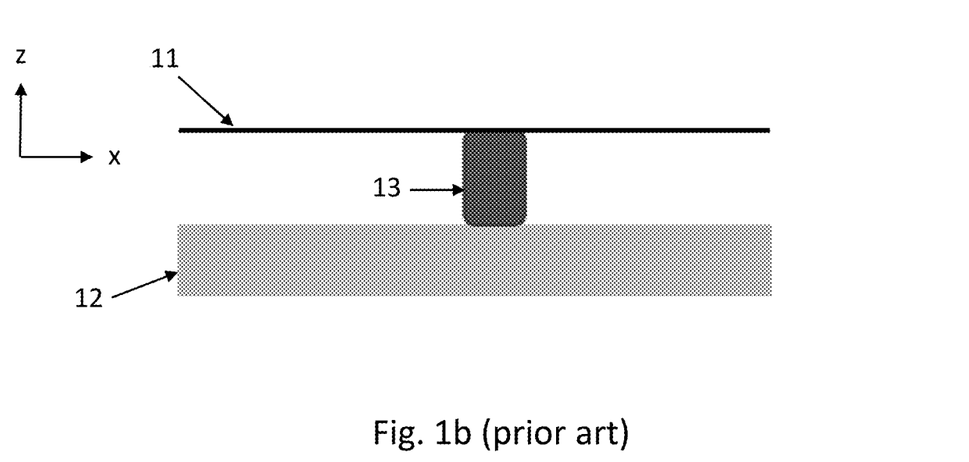

FIG. 1a illustrates a conventional motion limiter. As shown, a rotor 12 moves in the Z-direction toward a stator 11. The motion limiter comprises a bump 13 attached to the stator 11. If a predetermined displacement threshold is exceeded, the rotor 12 comes into contact with the bump 13 as FIG. 1b illustrates. This configuration prevents the rotor 12 from crashing into the stator 11, but a common problem (known as stiction) is that once the rotor 12 comes into contact with the bump 13, it will stick to them. Extra countermeasures might then have to be taken to dislodge the rotor. These countermeasures may have to include additional circuitry and programming for detecting stiction and for generating a dislodging force. Stiction can therefore disrupt device operation and the risk of stiction can add complexity to microelectromechanical devices. A second problem with the solution illustrated in FIG. 1a is that, if the external shock is strong, the impact between the rotor 12 and the bump 13 can cause structural damage either to the rotor or to the bump and release particles which might cause disturbances in the electric measurements which track the movement of the rotor.

SUMMARY

Accordingly, it is an object of the present disclosure to provide an apparatus where both the risk of stiction and the impact force are reduced.

Thus, in an exemplary aspect, a microelectromechanical element is provided that includes a first device part comprising a mobile rotor in a device layer that defines an XY-plane; a second device part disposed adjacent to the first device part and comprising a fixed stator that does not lie in the XY-plane; and a motion-limiting structure having a first stopper bump and a second stopper bump and that is configured to prevent the first device part from directly contacting the second device part. Moreover, in this aspect, the first and second stopper bumps extend from one of the first and second device parts toward the other of the first and second device parts. Furthermore, the first and second stopper bumps are dimensioned and arranged such that, when the mobile rotor moves toward the fixed stator in a Z-direction that is perpendicular to the XY-plane and crosses a displacement threshold, the first stopper bump contacts the second device part before the second stopper bump contacts the second device part and the second stopper bump contacts the second device part before the first device part contacts the second device part.

In general, the exemplary aspects of the disclosure are based on the idea of using two motion limiter bumps that come into contact with the rotor at different times. An advantage of this arrangement is that the continued movement in the rotor reduces the contact area between the rotor and both motion limiter bumps and divides the impact between the two bumps.

BRIEF DESCRIPTION OF THE DRAWINGS

In the following the disclosure will be described in greater detail by exemplary embodiments with reference to the accompanying drawings, in which.

DETAILED DESCRIPTION

In general, a rotor in a MEMS device is typically formed in a device layer, for example by etching the device layer. The device layer may be a silicon wafer or a layer of silicon which has been deposited on a substrate. The rotor is partially released from surrounding fixed structures when the device is manufactured. It may for example be suspended by flexible suspenders from fixed anchor points. The suspenders may be formed in the same etching process as the rotor, and the regions of the fixed structure where the anchor points are located may be regions of the device layer which are adjacent to the rotor.

A stator which is adjacent to the rotor in a MEMS device may be any part of the device layer which (unlike the rotor) remains fixed to a given position with respect to surrounding fixed structures regardless of the movement experienced by the device. The stator may be used as a fixed reference point in a measurement which tracks the movement of the rotor, for example in a capacitive measurement arrangement where a set of electrodes is prepared on the stator and a set of adjacent counter-electrodes is prepared on the rotor. A piezoelectric measurement arrangement may alternatively be prepared on a flexible suspender which extends from the stator to the rotor. However, according to an exemplary aspect, the fixed stator discussed in this disclosure does not have to be a structure which is used for measuring the movement of the rotor. The device may contain multiple stator structures which can be used for different purposes.

The device layer defines a device plane, which is illustrated as the XY-plane in this disclosure. The device plane may also be referred to as the horizontal plane. A direction which is perpendicular to the device plane is in this disclosure illustrated with a Z-axis, and it may be called the vertical direction or the out-of-plane direction. For purposes of this disclosure, there terms "horizontal" and "vertical" refer in this disclosure only to a plane and to a direction which is perpendicular to that plane. They do not imply anything about how the device should be oriented with respect to the earth's gravitational field when the device is manufactured or used. The same also applies to related terms such as "above" and "below", "high" and "low", "up" and "down".

In some technical applications, the rotor may be designed to undergo linear out-of-plane motion where the entire rotor moves out of the device plane. In other applications, the rotor may be designed to undergo rotational out-of-plane motion where it rotates about an axis which lies in the device plane. This disclosure presents motion limiters intended for limiting out-of-plane motion of any kind.

This disclosure describes a microelectromechanical element which comprises a first device part and a second device part. The first and second device parts are adjacent to each other. Either the first device part is a mobile rotor in a device layer which defines an XY-plane and the second device part is a fixed stator which does not lie in the XY-plane, or the second device part is a mobile rotor in a device layer which defines an XY-plane and the first device part is a fixed stator which does not lie in the XY-plane.

The microelectromechanical element also comprises a motion-limiting structure which comprises a first stopper bump and a second stopper bump. The motion-limiting structure is configured to prevent the first device part from coming into direct physical contact with the second device part.

The first and second stopper bumps extend from the first device part toward the second device part. The first and second stopper bumps are dimensioned and placed so that when the device part which is the mobile rotor moves toward the device part which is the fixed stator in the Z-direction which is perpendicular to the XY-plane and crosses a displacement threshold, the first stopper bump comes into contact with the second device part before the second stopper bump comes into contact with the second device part, and the second stopper bump comes into contact with the second device part before the first device part comes into contact with the second device part.

The microelectromechanical element may be an accelerometer or a gyroscope. The device part which is the mobile rotor may in some applications be called a mass element, a proof mass or a Coriolis mass. The rotor is in its rest position when no transducing force or external force acts upon it. The rotor may be moved away from its rest position, and for example driven into oscillating movement, by a force transducer built into the MEMS device. The rotor may also be moved away from its rest position by external forces which act on the MEMS device.

According to exemplary aspects described herein, the device part which is referred to as the "first device part" may be either the mobile rotor or the fixed stator which is adjacent to the rotor. The device part which is referred to as the "second device part" is then the other one of these two parts. These alternative configurations will be discussed in more detail below, with reference to the figures.

Figure 2A:
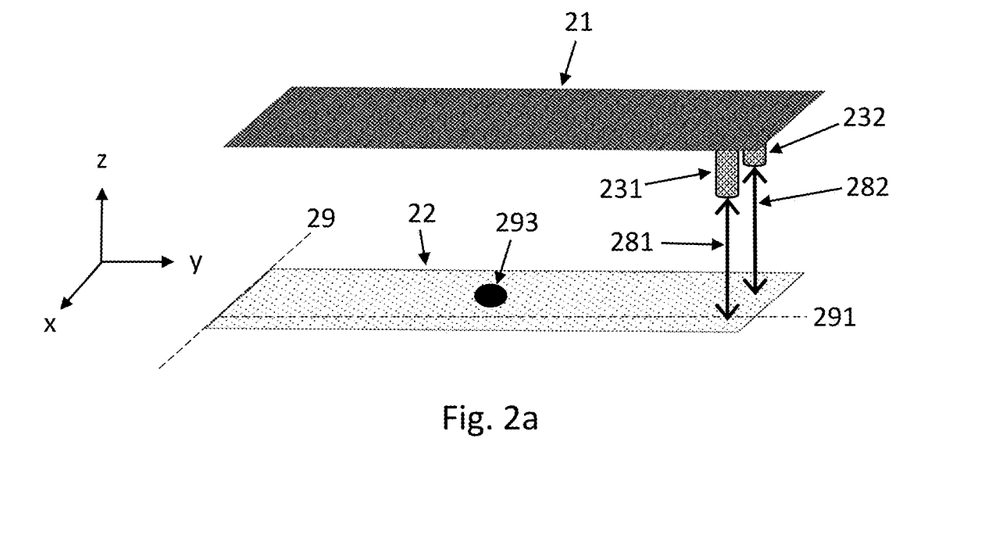
FIG. 2a illustrates a device where a first device part is the fixed stator and a second device part is the mobile rotor according to an exemplary aspect.

FIG. 2a illustrates a microelectromechanical element where a first device part 21 is the fixed stator and a second device part 22 is the mobile rotor. The first device part 21 lies above the second device part 22. The second device part 22 is in FIG. 2a shown in its rest position in the device plane (i.e., the XY-plane). The microelectromechanical element comprises a first stopper bump 231 and a second stopper bump 232 between the rotor and the stator. In this case the stopper bumps are attached to the stator 21 and extend toward the rotor 22.

In FIG. 2a the first and second stopper bumps are dimensioned so that the length of the first stopper bump 231 in the Z-direction is greater than the length of the second stopper bump 232 in the Z-direction. In other words, the vertical distance 281 from the first stopper bump 231 to the second device part 22 is less than the vertical distance 282 from the second stopper bump 232 to the second device part 22. This option applies to all embodiments presented in this disclosure.

Figure 2B:
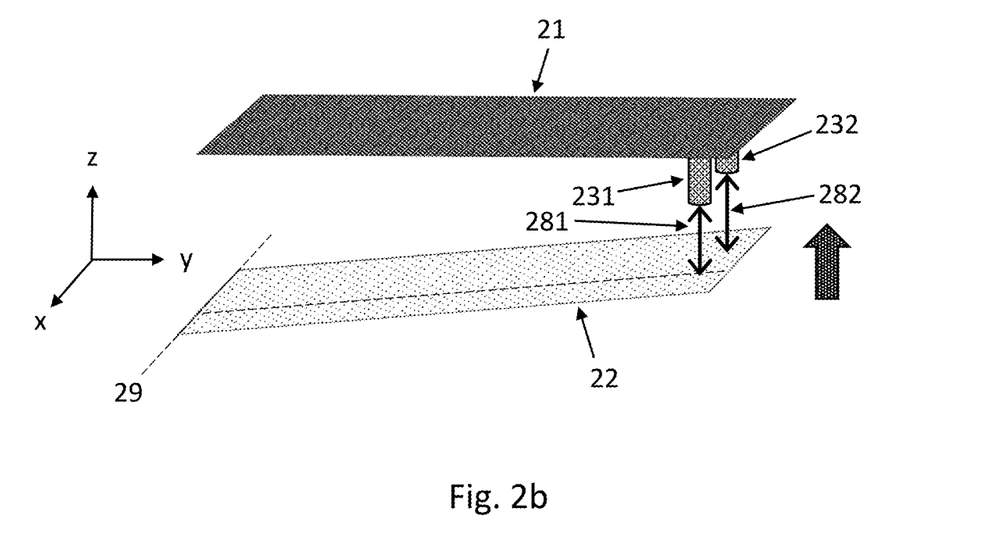
FIG. 2b illustrates the same device when the second device part has rotated out of the device plane according to an exemplary aspect.

FIG. 2b illustrates the same device when the second device part 22 has rotated out of the device plane. The second device part 22 may for example rotate about an axis 29 which lies in the device plane. The distance 281 is still smaller than 282, which means that, after the second device part has crossed the displacement threshold where the motion limiter is designed to start hindering the movement of the rotor, the first stopper bump 231 will make contact with the second device part 22 before the second stopper bump 232 makes contact with the second device part 22.

Figure 2C:
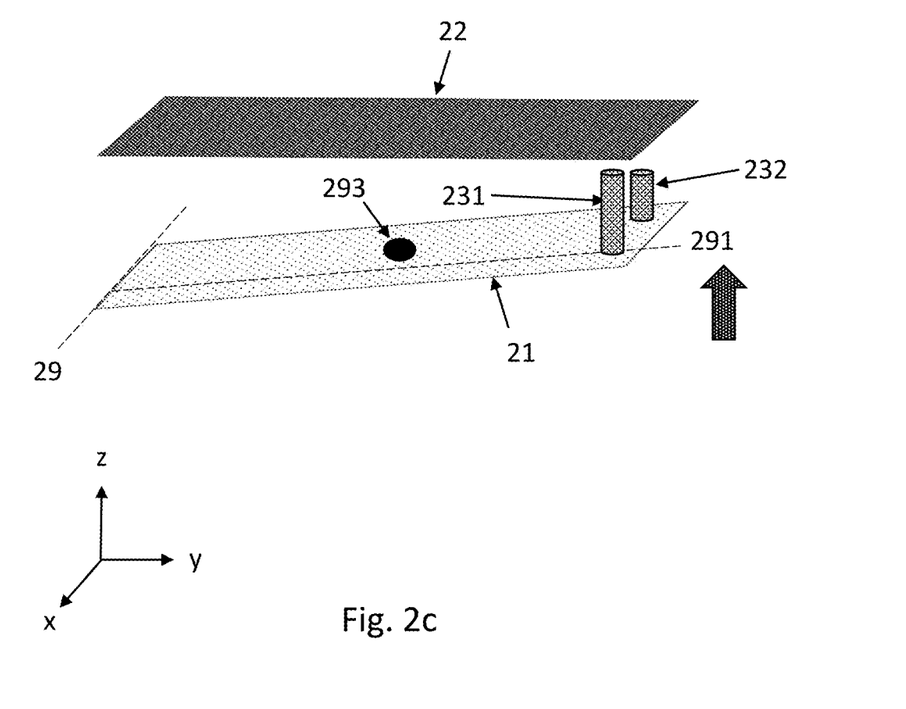
FIG. 2c illustrates a device where the first device part is the mobile rotor and the second device part is the fixed stator according to an exemplary aspect.

FIG. 2c illustrates an alternative option where the first device part 21 is the mobile rotor and the second device part 22 is the fixed stator. The stopper bumps are in this case attached to the moving rotor. As in FIGS. 2a-2b, the rotor 21 rotates out of the device plane about rotation axis 29, and the vertical distance from the first stopper bump 231 to the second device part 22 is less than the vertical distance from the second stopper bump 232 to the second device part 22. After the first device part has passed the displacement threshold, the first stopper bump 231 will therefore strike the second device part 22 before the second stopper bump 232 strikes it.

FIGS. 3a-3e illustrate the operating principle of the motion limiter, which applies to all embodiments presented in this disclosure. Reference numbers 31, 32 and 331-332 correspond to reference numbers 21, 22 and 231-232, respectively, in FIGS. 2a-2b. In other words, these figures illustrate the option where the second device part 32 is the rotor. However, the same operating principle applies also in FIG. 2c where the first device part 21 is the rotor. Furthermore, although FIGS. 2a-2b illustrate a rotating rotor, the same operating principle applies also in the case of a rotor which moves in linear translation out of the device plane.

Figure 3A:
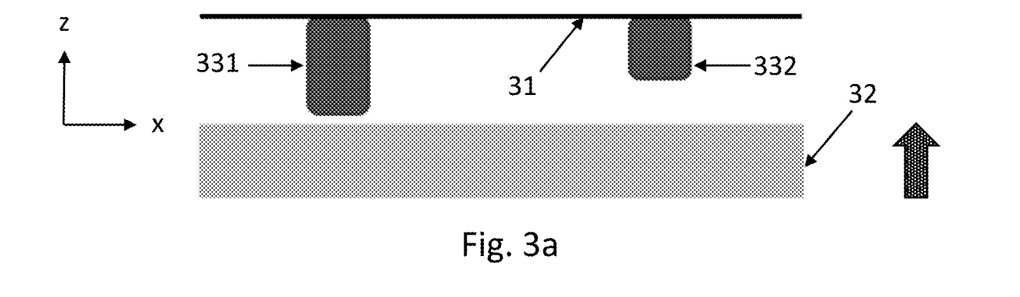
FIGS. 3a-3e illustrate the operating principle of the motion limiter according to an exemplary aspect.
Figure 3B:
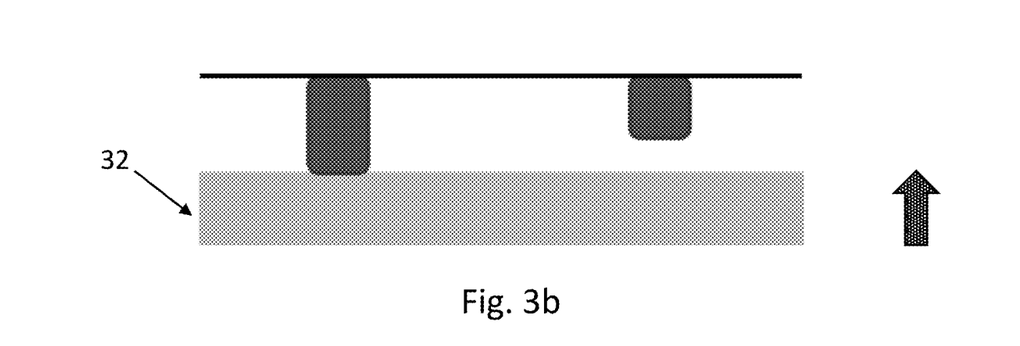
Figure 3C:
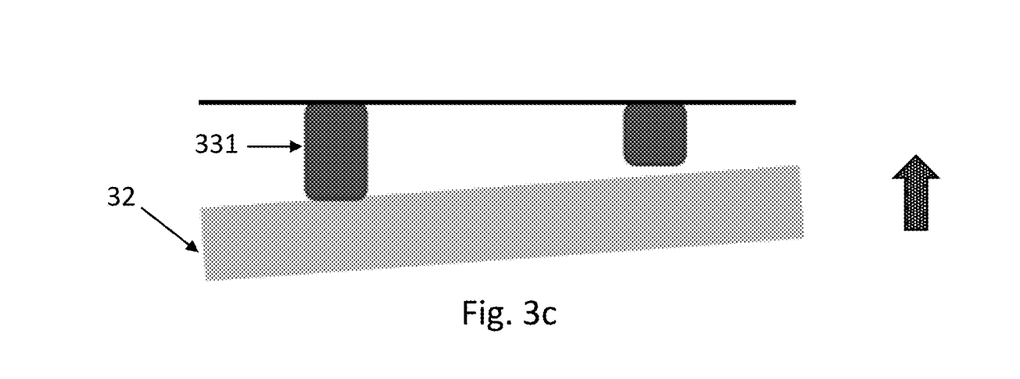
Figure 3D:
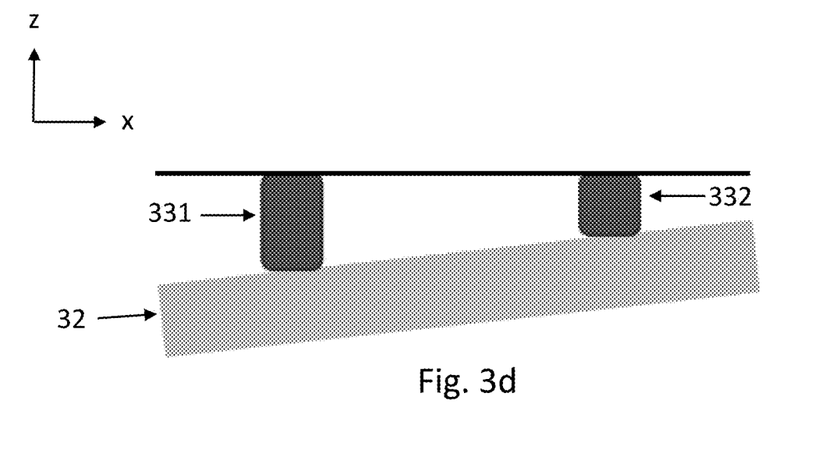

The arrow on the right in FIG. 3a illustrates that the rotor 32 is moving upward toward the first device part 31. The rotor is approaching the displacement threshold as it moves closer and close to the first stopper bump 331. In FIG. 3b the threshold has been crossed and the first stopper bump 331 makes contact with the rotor 32. However, the first stopper bump does not bring the rotor to a full stop. Instead, the momentum of the rotor 32 still carries it upward in FIG. 3c. The force imparted by the first stopper bump 331 induces a twisting or tilting motion in the rotor 32 about the Y-axis which is perpendicular to the illustrated XY-plane. In FIG. 3d the second stopper bump 332 also makes contact with the rotor 32 and stops the upward movement.

In other words, if the first device part is the stator and the second device part is the rotor, then the second device part (or an impact absorber on the second device part, see the third embodiment below) can be configured to twist or tilt toward the second stopper bump after it makes contact with the first stopper bump. On the other hand, if the first device part is the rotor and the second device part is the stator, then the side of the first device part (or the side of an impact absorber on the first device part) where the second stopper bump is located may twist or tilt toward the stator after the first stopper bump has made contact with the stator. In both of these alternatives, the second stopper bump comes into contact with the second device part after the first stopper bump has come into contact with the second device part because the device part which is the rotor (or an impact absorber on the rotor) twists or tilts. The momentum of the rotor generates this twisting or tilting after the initial contact between the first stopper bump and the second device part.

The surface area on the bottom of the first and second stopper bumps 331 and 332 should preferably not be very small because the impact of a sharp bump could damage the second device part. On the other hand, the risk of stiction is greater if the surface area is large. In FIG. 3c the rotor 32 undergoes a twisting or tilting motion which reduces the surface area where the rotor 32 sticks to the first stopper bump 331. Similarly, the rotor 22 will not stick strongly to the second stopper bump 332 in FIG. 3d because their surfaces are not parallel at impact.

Figure 3E:
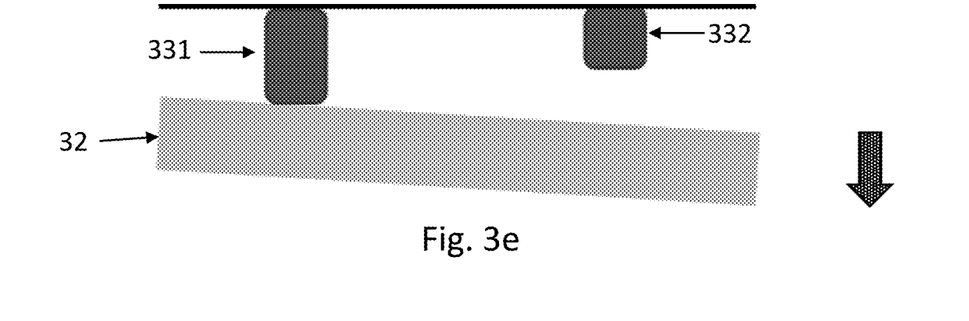

In FIG. 3d a restoring force begins to pull the rotor 32 downward again. This restoring force is generated by the suspension structure from which the rotor is suspended, which strives to bring the rotor back towards its rest position. If the restoring force can overcome the stiction, the rotor will return back to normal operation. The restoring force releases the rotor 32 from the second stopper bump 332 and then from the first stopper bump 331, as FIG. 3e illustrates. The surface area which sticks the rotor to the stopper bumps is in each case diminished (because the surfaces are not parallel), and the restoring force can release the rotor with ease.

An additional benefit of the arrangement illustrated in FIGS. 3a-3e is that the force of the first impact which occurs between the rotor 32 and the first stopper bump 331 in FIG. 3b is smaller than the corresponding force in FIG. 1b because the first stopper bump 331 does not bring the rotor to a full stop. Instead, the upward momentum of the rotor 32 turns it toward the second stopper bump 332. The rotor has been brought to a full stop in FIG. 3d with two successive impacts. The impact has therefore been divided onto two stopper bumps, and the risk of structural damage due to impact has been reduced.

The twisting or tilting illustrated in FIGS. 3a and 3e results from the placement and dimensioning of the stopper bumps, from the properties of the flexible suspension arrangement which guides the movement of the rotor, and from the structure of the rotor itself. This will be discussed in more detail in the embodiments below.

In all exemplary embodiments described herein, the first and second stopper bumps are positioned and dimensioned so that the upward momentum of the rotor will carry some part of the rotor toward the second stopper bump after the rotor has made contact with the first stopper bump. The second stopper bump is also placed sufficiently close to the rotor to ensure that the twisting or tilting of the rotor will bring the rotor into contact with the second stopper bump before the movement of the rotor stops completely, and before the rotor makes physical contact with the stator.

In any exemplary embodiment presented in this disclosure, the first and second stopper bumps may be rigid or substantially rigid, so that they do not flex in the vertical direction when they come into contact with the second device part.

Moreover, the optimal distances, dimensions and positions of the first and second stopper bumps will depend at least on the dimensions and mechanical properties of the rotor and on how the flexible suspension structure of the rotor has been designed.

First Exemplary Embodiment

In the first exemplary embodiment, the movement of the device part which is the mobile rotor toward the device part which is the fixed stator in the Z-direction is rotational movement about a rotation axis which lies in the XY-plane. This movement is illustrated in FIGS. 2a-2c.

In the exemplary embodiment, the device part which is the mobile rotor may comprise a rotor line which is perpendicular to the rotation axis and crosses the region where the first stopper bump comes into contact with the second device part, and the center of mass of the mobile rotor and the region where the second stopper bump comes into contact with the second device part are on the same side of the rotor line.

FIG. 2a illustrates a rotor line 291 on the rotor 22. The rotor line is perpendicular to the rotation axis 29 and crosses the point where the first stopper bump will come in contact with the rotor 22. The projection of the first stopper bump 231 onto the XY-plane therefore lies on the line 291, as the arrow 281 illustrates. The center of mass 293 of the rotor 22 and the projection of the second stopper bump 232 onto the XY-plane lie on the same side of the rotor line 291. The rotor 22 will twist or tilt so that it keeps moving upward on this second side after it makes contact with the first stopper bump 231, and this twisting or tilting movement will occur toward the second stopper bump 232.

In FIG. 2c, the rotor line 291 crosses the point where the first stopper bump 231 is located on the rotor 21. Again, the center of mass 293 of the rotor 21 and the second stopper bump are on the same side of the rotor line 291. The rotor 21 will twist or tilt after the first stopper bump 231 makes contact with the stator 22, and this twisting or tilting movement will bring the second stopper bump 232 in contact with the stator 22.

The suspension structure (not illustrated in FIGS. 2a-2c), which allows the rotor to rotate about the axis 29 may be designed so that it is flexible enough to allow the rotor to tilt. Alternatively or complementarily, the rotor 22 itself may be sufficiently flexible to undergo torsional twisting about the Y-axis.

Figure 4A:
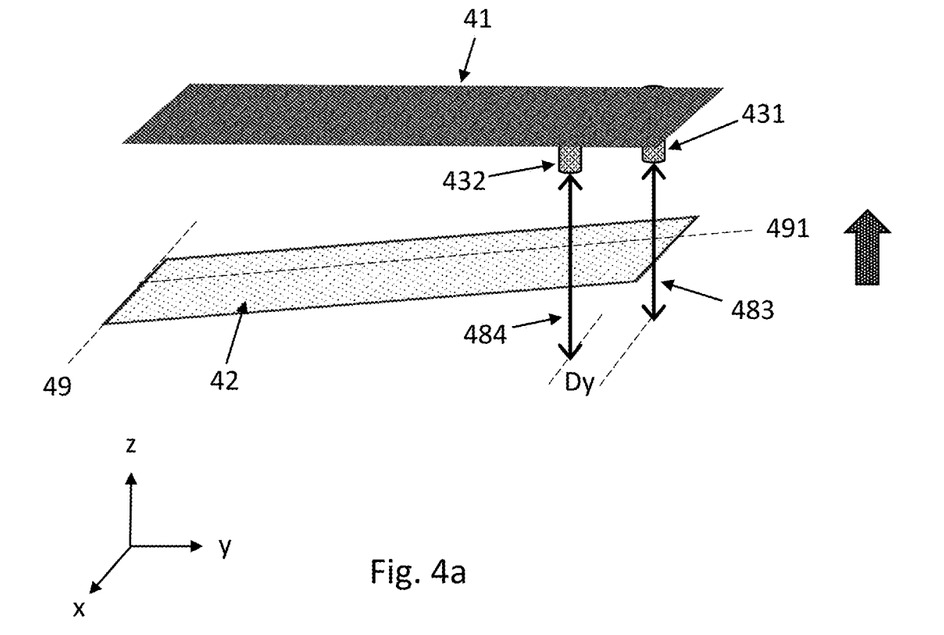
FIGS. 4a-4b illustrate a device where first and second stopper bumps may lie at different distances from a rotation axis according to an exemplary aspect.
Figure 4B:
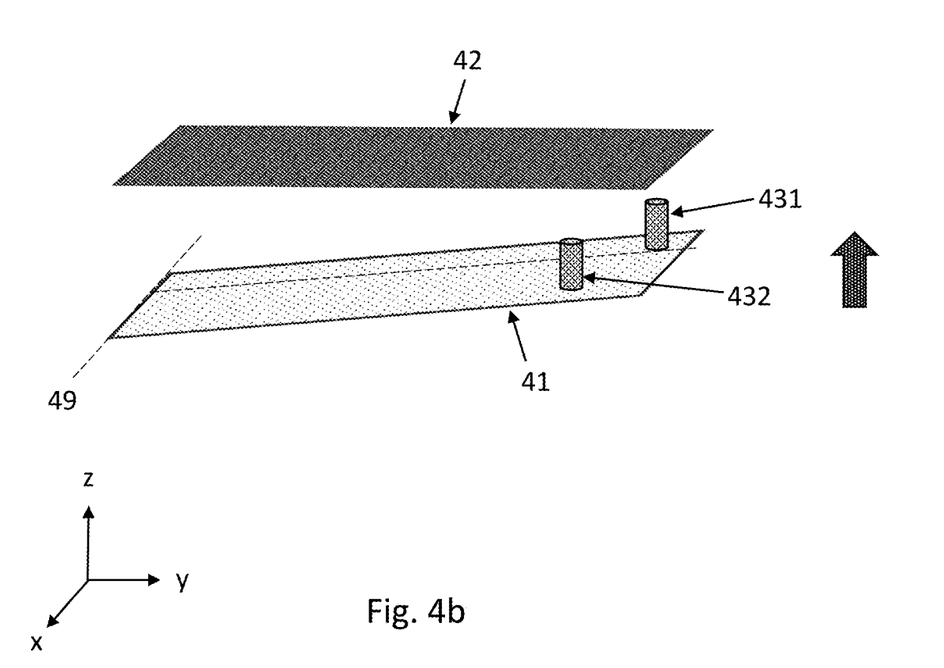

In FIGS. 2a-2c, the first and second stopper bumps 231 and 232 have the same Y-coordinate. However, the first and second stopper bumps may alternatively be placed so that the first stopper bump lies further away from the rotation axis than the second stopper bump. This is illustrated in FIGS. 4a-4b, where reference numbers 41, 42, 431-432, 49 and 491 correspond to reference numbers 21, 22, 231-232, 29 and 291, respectively, in FIGS. 2a-2c. It can be seen that the second device part 42 is the rotor in FIG. 4a, while the first device part 41 is the rotor in FIG. 4b.

According to the exemplary embodiment, the first and second stopper bumps have different Y-coordinates in FIGS. 4a-4b. In other words, the projection 483 of the first stopper bump 431 to the XY-plane is separated from the corresponding projection 484 of the second stopper bump 432 by a distance Dy. In this case the vertical distances indicated by the arrows 483 and 484 may be the same, or they may be different. In other words, the vertical distance from the first stopper bump 431 to the second device part 42 may be the same as the vertical distance from the second stopper bump 432 to the second device part 42, or these two distances may be different. The center of mass of the rotor and the second stopper bumps 432 may lie on the same side of the rotor line 491 which crosses the impact region of the first stopper bump, as described above with reference to FIGS. 2a-2c.

Second Exemplary Embodiment

In the second embodiment, the movement of the device part which is the mobile rotor toward the device part which is the fixed stator in the Z-direction is translational movement in the Z-direction.

Figure 5A:
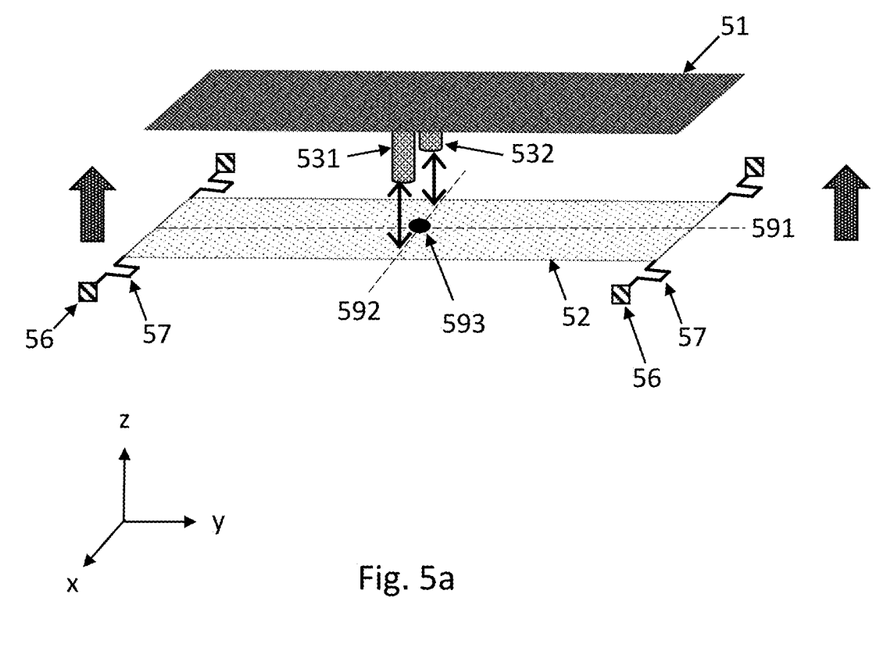
FIGS. 5a-5c illustrate a device where the movement of the rotor is translational according to an exemplary aspect.
Figure 5B:
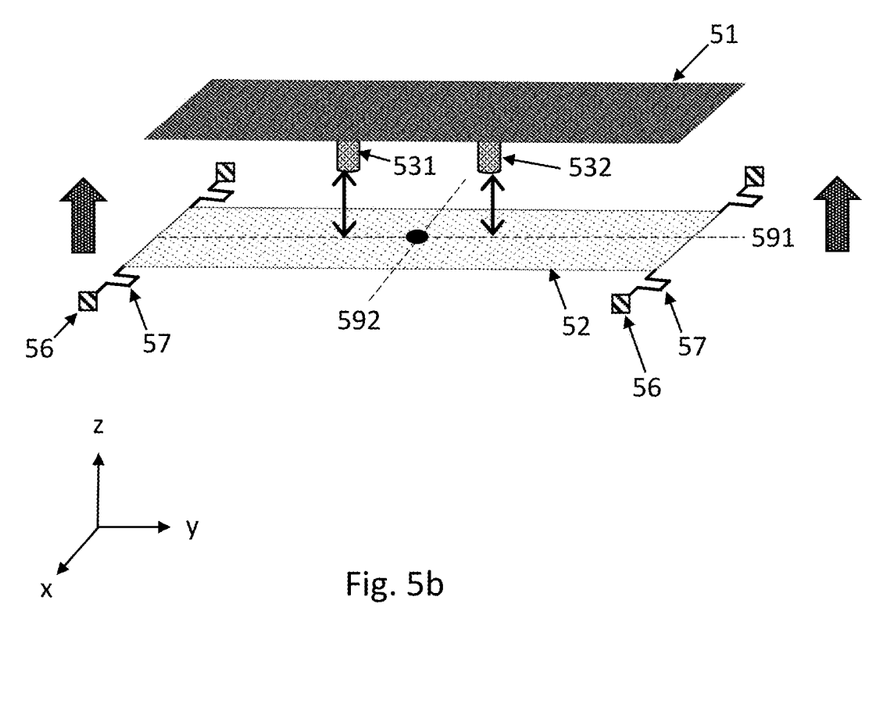
Figure 5C:
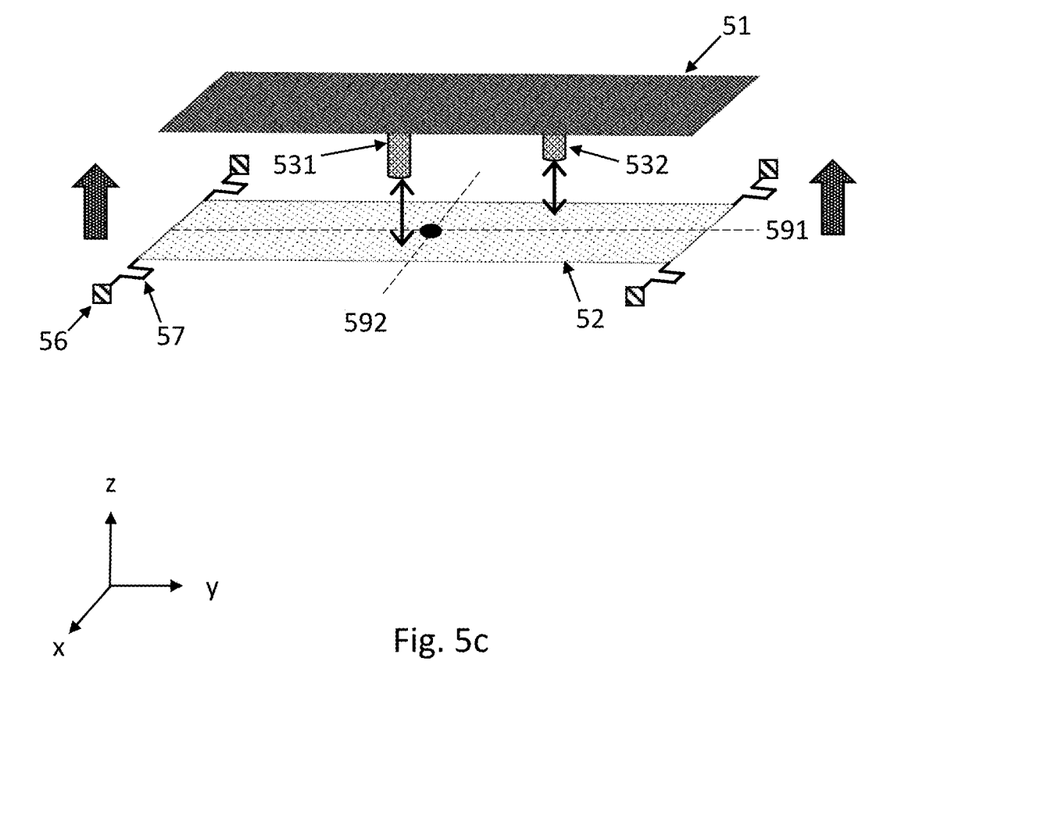

FIGS. 5a-5c illustrate this. Reference numbers 51, 52, 531-532 and 593 correspond to reference numbers 21, 22, 231-232 and 293, respectively, in FIG. 2a, except for the fact that the out-of-plane movement of the rotor 52 is linear translation. The rotor 52 is suspended from fixed anchor points 56 by a suspension structure 57, which allows both the left and right sides of the rotor to move in the Z-direction. FIGS. 5a-5c illustrate a situation where the second device part 52 is the mobile rotor, but the same options apply also if the first device part is the mobile rotor (i.e., if the stopper bumps would be attached to the rotor).

The region where the first stopper bump 531 comes into contact with the second device part 52 may be on a first side of the center of mass 593 of the device part which is the mobile rotor, and the region where the second stopper bump 532 comes into contact with the second device 52 part may be on a second side of the center of mass 593 of the device part which is the mobile rotor. The first side of the center of mass may be opposite to the second side.

The stopper bumps can be arranged in many different ways, and the optimal arrangement depends on the geometry of the rotor 52 and on properties of the suspension structure 57. FIGS. 5a-5c illustrate a first rotor line 591 which crosses a second rotor line 592 orthogonally at the center of mass 593 of the rotor. The rotor lines are in this case parallel to the edges of the rotor 52. In FIG. 5a the two stopper bumps are aligned on the second rotor line 592 on opposite sides of the center of mass 593, while in FIG. 5b they are aligned on the first rotor line 591 on opposite sides. In FIG. 5c they are on opposite sides but not aligned on either rotor line.

The first and second rotor bumps 531-532 are aligned on a line which crosses the center of mass 593 in each FIG. 5a-5c, but this is not a necessary requirement. The second rotor bump may alternatively be located in a position which lies at a nonzero distance from a line which crosses the position of the first rotor bump and the center of mass. It is sufficient that the first side of the center of mass (where the first stopper bump is located) is opposite to the second side (where the second stopper bump is located) in the sense that the impact between second device part and the first stopper bump will twist or tilts the rotor in a direction which brings the second device part into contact also with the second stopper bump.

The first and second stopper bumps 531-532 may be dimensioned so that the length of the first stopper bump in the Z-direction is greater than the length of the second stopper bump in the Z-direction, or they may have the same length in the Z-direction. The distance from the first stopper bump (or its projection on the rotor 52) to the center of mass 593 may be equal to or different from the distance from the second stopper bump (or its projection on the rotor 52) to the center of mass 593.

Third Exemplary Embodiment

In an exemplary aspect, the exemplary third embodiment can be combined with either the first embodiment or with the second embodiment. In this embodiment the device part which is the mobile rotor comprises a main rotor body and an impact absorber which is attached to the main rotor body and defines an impact region, wherein the first and second stopper bumps are placed in the impact region and the impact absorber is attached to the main rotor body with an attachment structure which allows the impact absorber to tilt with respect to the main rotor body.

If the second device part is the mobile rotor, then the first and second stopper bumps may be placed in the impact region above the rotor, so that they will come in contact with the impact absorber when the rotor crosses the impact threshold. If the first device part is the rotor, then the first and second stopper bumps may be placed in the impact region on the rotor itself. In other words, in the latter case the first and second stopper bumps will be on the impact absorber.

Figure 6A:
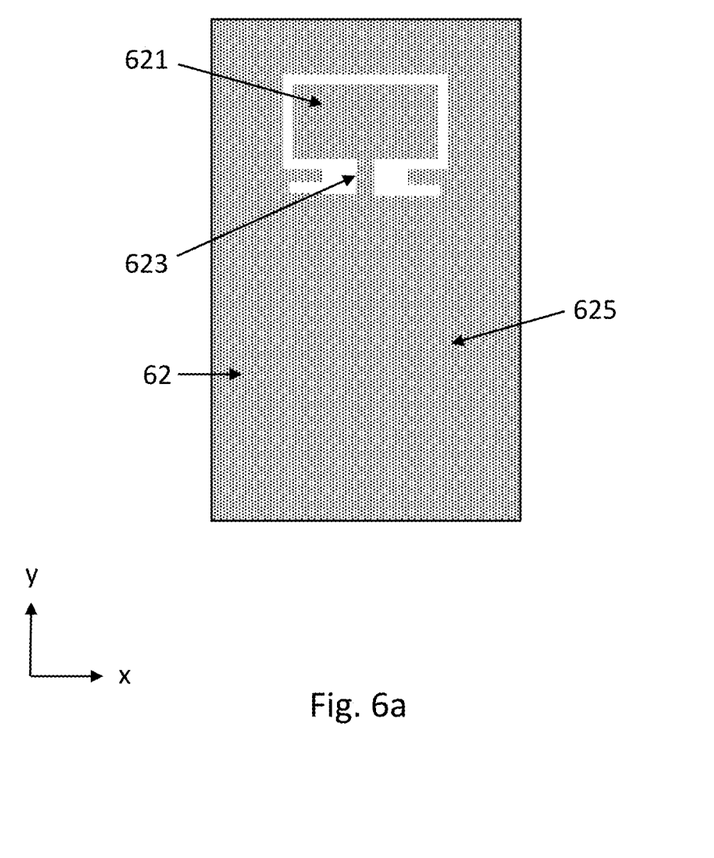
FIGS. 6a-6f illustrate a rotor with an impact absorber according to an exemplary aspect.
Figure 6B:
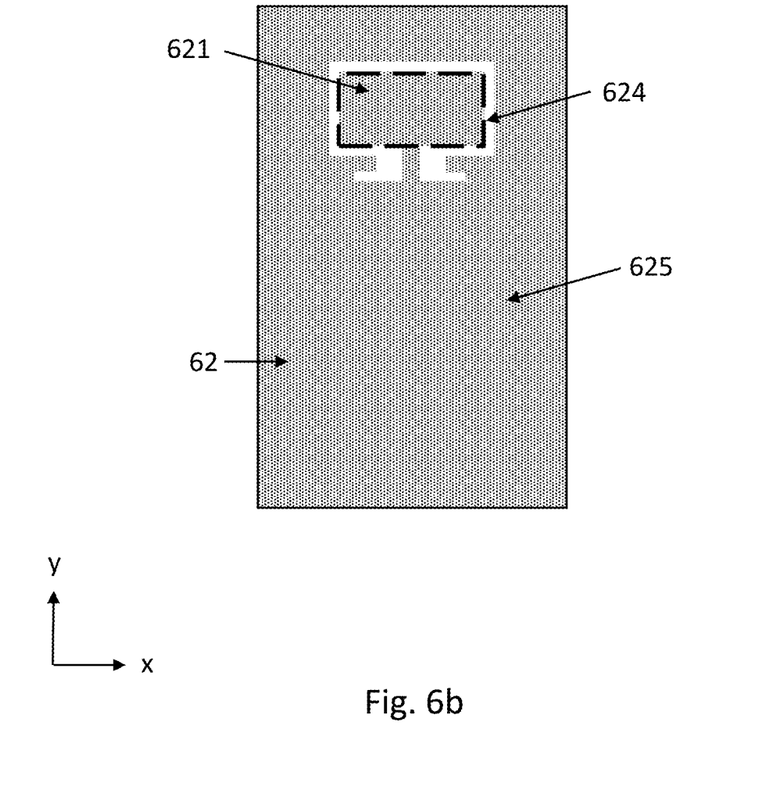

FIGS. 6a-6b illustrate a rotor 62. The rotor comprises a main rotor body 625 and an impact absorber 621. The impact absorber 621 is in this case surrounded by the main rotor body 625. The impact absorber 621 is attached to the main rotor body 625 with a torsionally flexible first attachment spring 623 which extends in the Y-direction.

It is noted that the geometries illustrated for the impact absorber 621 and first attachment spring 623 in FIG. 6a are just one possibility of many. In other exemplary aspects, other spring arrangements could also be used to allow the impact absorber to tilt out of the XY-plane, and the spring or springs which attach the impact absorber to the main rotor body do not necessarily need to be aligned with the sides of the main rotor body 625. The impact absorber could alternatively be located on the edge of the main rotor body, and it could have any shape and size.

FIG. 6b illustrates the impact region 624 (marked with a dashed line) which is defined by the impact absorber 621 in the XY-plane. The first and second stopper bumps lie within the impact region if their X- and Y-coordinates lie within this region (even though their Z-coordinate differs from the Z-coordinate of the proof mass if they are attached to the stator).

Moreover, the tilting of the impact absorber with respect to the main rotor body may occur about a tilting axis. The region where the first stopper bump comes into contact with the second device part may be on a first side of the tilting axis, and the region where the second stopper bump comes into contact with the second device part may be on a second side of the tilting axis. The first side of the tilting axis is opposite to the second side of the tilting axis.

In general, whenever a point on a first side of an axis is distinguished from a point on a second side of an axis in this disclosure, the axis lies between the two points. In other words, to get from one point to the other in the plane where these points and the axis lie, the axis must be crossed. When two points lie on opposite sides of a center, then the center lies between the two points so that (A) the distance between: (i) the center and (ii) a line drawn between these two points, is less than (B) the distance between the two points.

Figure 6C:
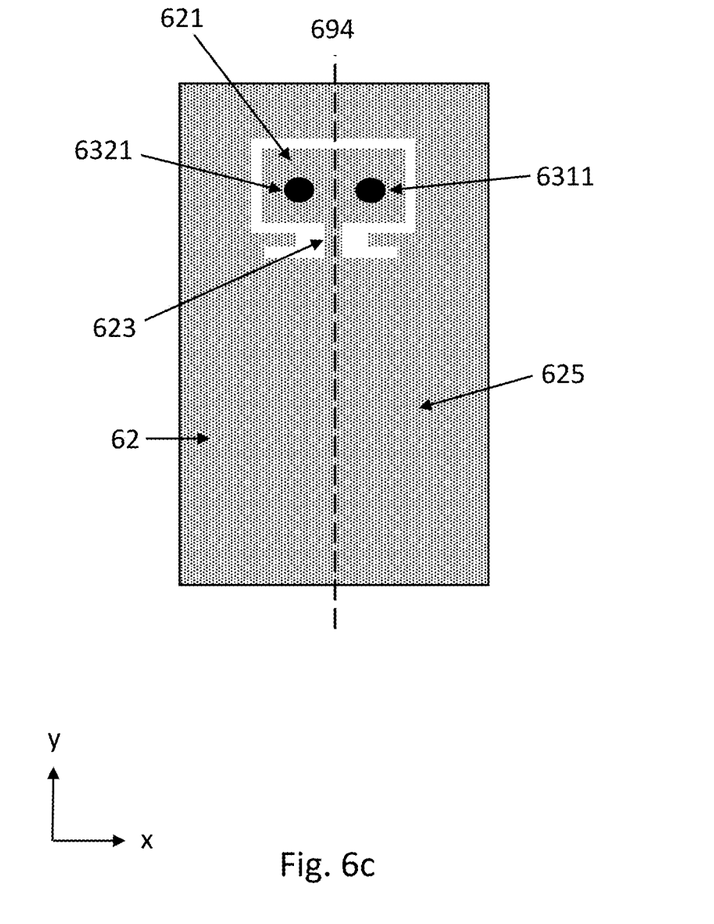

FIG. 6c illustrates the tilting axis 694, which is in this case defined by the position of the first attachment spring 623. The locations 6311 and 6321 of the first and second stopper bumps 631 and 632 in the XY-plane are also illustrated. Any of the mechanisms presented earlier for bringing the first stopper bump into contact with the second device part before the second stopper bump comes into contact with the second device part, and then bringing the second stopper bump into contact with the second device part before the first device part comes into contact with the second device part, can be applied in this case as well. In other words, the length of the first stopper bump 631 in the Z-direction may be greater than the length of the second stopper bump 632 in the Z-direction. Alternatively, in the case of a rotating rotor, the first and second stopper bumps may be placed so that the first stopper bump lies further away from the rotation axis than the second stopper bump. In the latter case the two stopper bumps may either have equal vertical lengths or their lengths may be different, as described in the first embodiment above.

As shown in FIG. 6c, the first stopper bump 631 lies on the right first side of the tilting axis 694. When the first stopper bump makes contact with the impact absorber, the momentum of the rotor 62 will still carry it further, and the first attachment spring 623 will begin to twist torsionally. The impact absorber 621 will then tilt away from the plane defined by the main rotor body 625. The second stopper bump lies on the second, opposite side of the tilting axis 694. The impact absorber 621 will tilt toward this second stopper bump after it makes contact with the first stopper bump. The operating principle illustrated in FIG. 3a-3e (where the rotor 32 should in this case be replaced with the impact absorber 621) will then allow the impact absorber to prevent contact between the rotor and the stator without risk of stiction. The force which restores the impact absorber back to its original position after impact is the torsional tension which was stored in the first attachment spring 623 as it twists.

Figure 6D:
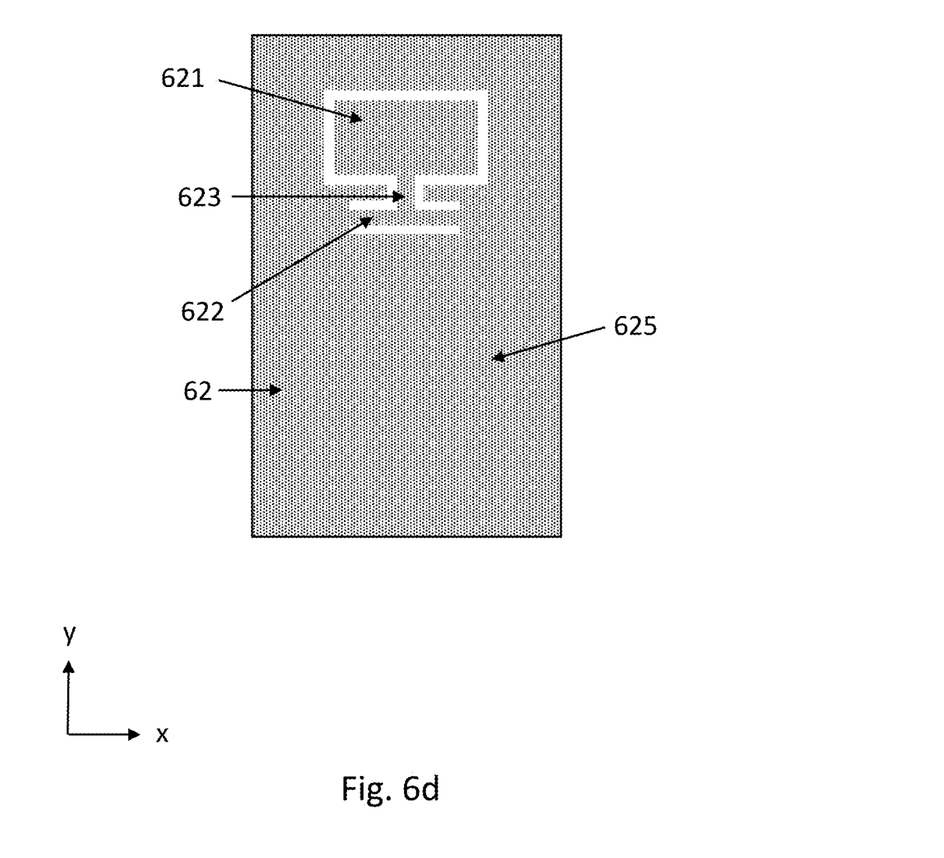
Figure 6E:
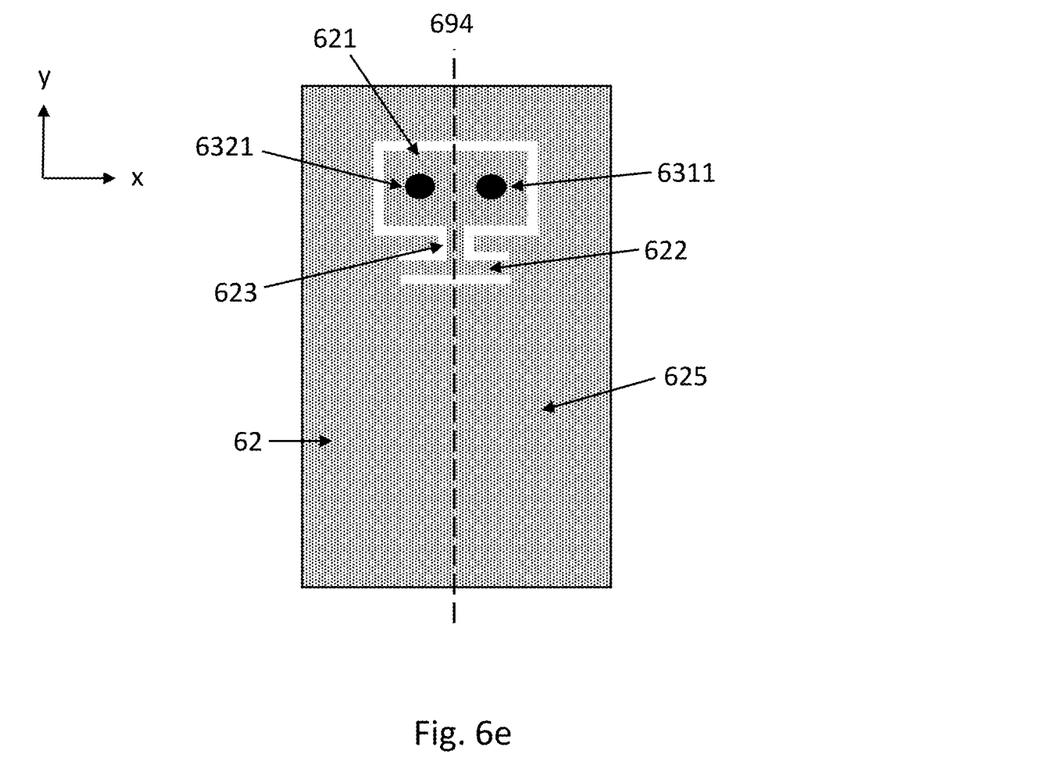

FIG. 6d illustrates an impact absorber 621 which is attached to the main rotor body 625 with two attachment springs, a torsionally flexible first attachment spring 623 which extends in the Y-direction and a torsionally flexible second attachment spring 622 which extends in the X-direction. The first attachment spring 623 is attached between the second attachment spring 622 and the impact absorber 621. The second attachment spring gives the impact absorber 621 additional flexibility for bending out of the plane of the main rotor body 625. FIG. 6e illustrates the tilting axis 694, which is defined by the first attachment spring 623 as in FIG. 6c. The torsional tension of the second attachment spring 622 will in this case also contribute to the force which restores the impact absorber back to its original position after impact.

Figure 6F:
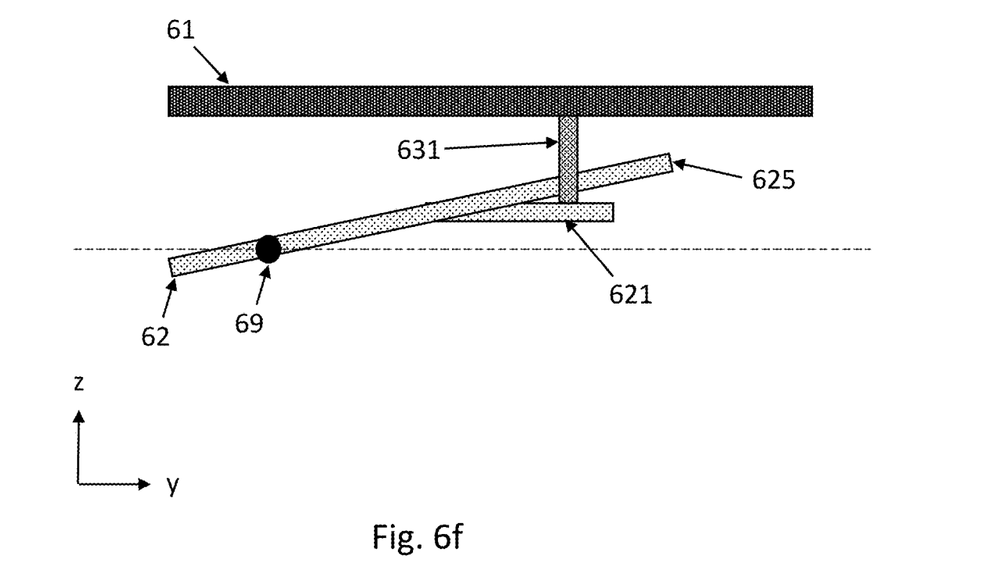

FIG. 6f illustrates schematically the operation of the impact absorber after the first stopper bump 631 has made contact with the rotor 62. 69 is the rotation axis of the rotor, but the movement of the rotor 62 toward the stator 61 could alternatively be linear translation. The second attachment spring 622 allows the impact absorber 621 to bend away from the main rotor body 625. This softens the impact of the stopper bumps on the rotor. The same bending may occur to some extent also in the device illustrated in FIG. 6a, but in that case the first attachment spring 623 must bend lengthwise.

One technical advantage of the third exemplary embodiment is that the operating principle described above can be implemented simply by designing the torsionally flexible springs and the impact absorber in a suitable manner. Thus, it is not necessary in this embodiment for the main rotor body to twist or tilt—the twisting or tilting of the impact absorber is enough. In other words, the mechanism illustrated in FIGS. 3a-3e, which prevents stiction and reduces impact force, will in this embodiment not necessarily be dependent on how much the suspension arrangement allows the entire rotor to tilt, or how easily the rotor itself can twist. The desired twisting and tilting can instead be (at least partly) produced by the spring arrangement which attaches the impact absorber 621 to the main rotor body 625.

In general, it is noted that the exemplary embodiments described above are intended to facilitate the understanding of the present invention and are not intended to limit the interpretation of the present invention. The present invention may be modified and/or improved without departing from the spirit and scope thereof, and equivalents thereof are also included in the present invention. That is, exemplary embodiments obtained by those skilled in the art applying design change as appropriate on the embodiments are also included in the scope of the present invention as long as the obtained embodiments have the features of the present invention. For example, each of the elements included in each of the embodiments, and arrangement, materials, conditions, shapes, sizes, and the like thereof are not limited to those exemplified above and may be modified as appropriate. It is to be understood that the exemplary embodiments are merely illustrative, partial substitutions or combinations of the configurations described in the different embodiments are possible to be made, and configurations obtained by such substitutions or combinations are also included in the scope of the present invention as long as they have the features of the present invention.

What is claimed:

1. A microelectromechanical element comprising:
    a first device part comprising a mobile rotor in a device layer that defines an XY-plane;
    a second device part disposed adjacent to the first device part and comprising a fixed stator that does not lie in the XY-plane; and
    a motion-limiting structure having a first stopper bump and a second stopper bump and that is configured to prevent the first device part from directly contacting the second device part,
    wherein the first and second stopper bumps extend from one of the first and second device parts toward the other of the first and second device parts,
    wherein the first and second stopper bumps are dimensioned and arranged such that, when the mobile rotor moves toward the fixed stator in a Z-direction that is perpendicular to the XY-plane and crosses a displacement threshold, the first stopper bump contacts the second device part before the second stopper bump contacts the second device part and the second stopper bump contacts the second device part before the first device part contacts the second device part.

2. The microelectromechanical element according to claim 1, wherein the mobile rotor is configured to move towards the fixed stator in the Z-direction as a rotational movement about a rotation axis that lies in the XY-plane.

3. The microelectromechanical element according to claim 2, wherein the mobile rotor comprises a rotor line that is perpendicular to the rotation axis and crosses a region where the first stopper bump comes into contact with the second device part, and a center of mass of the mobile rotor and a region where the second stopper bump comes into contact with the second device part are on a same side of the rotor line.

4. The microelectromechanical element according to claim 2, wherein the first and second stopper bumps are disposed so that the first stopper bump lies farther away from the rotation axis than the second stopper bump.

5. The microelectromechanical element according to claim 3, wherein the mobile rotor comprises a main rotor body and an impact absorber attached to the main rotor body and that defines an impact region.

6. The microelectromechanical element according to claim 5, wherein the first and second stopper bumps are disposed in the impact region and the impact absorber is attached to the main rotor body with an attachment structure that configures the impact absorber to tilt with respect to the main rotor body.

7. The microelectromechanical element according to claim 6, wherein a tilting of the impact absorber with respect to the main rotor body occurs about tilting axis, and the region where the first stopper bump comes into contact with the second device part is on a first side of the tilting axis, and the region where the second stopper bump comes into contact with the second device part is on a second side of the tilting axis, with the first side of the tilting axis being opposite to the second side of the tilting axis.

8. The microelectromechanical element according to claim 7, wherein the impact absorber is attached to the main rotor body with a torsionally flexible first attachment spring and a torsionally flexible second attachment spring.

9. The microelectromechanical element according to claim 8, wherein the first attachment spring is perpendicular to the second attachment spring, the second attachment spring extends between the main rotor body and the first attachment spring, and the first attachment spring extends between the second attachment spring and the impact absorber.

10. The microelectromechanical element according to claim 1, wherein the mobile rotor is configured to move towards the fixed stator in the Z-direction as a translational movement in the Z-direction.

11. The microelectromechanical element according to claim 10, wherein a region where the first stopper bump comes into contact with the second device part is on a first side of a center of mass of the mobile rotor, and a region where the second stopper bump comes into contact with the second device part is on a second side of the center of mass of the mobile rotor, with the first side of the center of mass being opposite to the second side.

12. The microelectromechanical element according to claim 11, wherein the mobile rotor comprises a main rotor body and an impact absorber attached to the main rotor body that defines an impact region.

13. The microelectromechanical element according to claim 12, wherein the first and second stopper bumps are disposed in the impact region and the impact absorber is attached to the main rotor body with an attachment structure that configures the impact absorber to tilt with respect to the main rotor body.

14. The microelectromechanical element according to claim 13, wherein a tilting of the impact absorber with respect to the main rotor body occurs about a tilting axis, and the region where the first stopper bump comes into contact with the second device part is on a first side of the tilting axis, and the region where the second stopper bump comes into contact with the second device part is on a second side of the tilting axis, with the first side of the tilting axis being opposite to the second side of the tilting axis.

15. The microelectromechanical element according to claim 13, wherein the impact absorber is attached to the main rotor body with a torsionally flexible first attachment spring and a torsionally flexible second attachment spring.

16. The microelectromechanical element according to claim 15, wherein the first attachment spring is perpendicular to the second attachment spring, the second attachment spring extends between the main rotor body and the first attachment spring, and the first attachment spring extends between the second attachment spring and the impact absorber.

17. The microelectromechanical element according to claim 1, wherein the first stopper bump has a length in the Z-direction that is greater than a length of the second stopper bump in the Z-direction.

18. A microelectromechanical element comprising:
a mobile rotor in a device layer that defines an XY-plane;
a fixed stator that does not lie in the XY-plane; and
a motion-limiting structure having a first stopper bump and a second stopper bump and that is configured to prevent the mobile rotor from directly contacting the fixed stator,
wherein the first and second stopper bumps extend from the mobile rotor towards the fixed stator,
wherein the first and second stopper bumps are configured such that, when the mobile rotor moves toward the fixed stator in a Z-direction that is perpendicular to the XY-plane and crosses a displacement threshold, the first stopper bump contacts the fixed stator before the second stopper bump contacts the fixed stator and the second stopper bump contacts the fixed stator before the mobile rotor contacts the fixed stator.

19. The microelectromechanical element according to claim 18,
wherein the mobile rotor is configured to move towards the fixed stator in the Z-direction as a rotational movement about a rotation axis that lies in the XY-plane, and
wherein the mobile rotor comprises a rotor line that is perpendicular to the rotation axis and crosses a region where the first stopper bump comes into contact with the fixed stator, and a center of mass of the mobile rotor and a region where the second stopper bump comes into contact with the fixed stator are on a same side of the rotor line.

20. The microelectromechanical element according to claim 18, wherein the first stopper bump has a length in the Z-direction that is greater than a length of the second stopper bump in the Z-direction.

* * * * *